(12) United States Patent
Kitaura et al.

(10) Patent No.: US 6,229,785 B1
(45) Date of Patent: May 8, 2001

(54) OPTICAL INFORMATION RECORDING MEDIUM, ITS MANUFACTURING METHOD, OPTICAL INFORMATION RECORDING/REPRODUCING METHOD AND OPTICAL INFORMATION RECORDER/REPRODUCER

(75) Inventors: Hideki Kitaura, Osaka; Ken'ichi Nagata, Hyogo; Noboru Yamada; Kenichi Nishiuchi, both of Osaka, all of (JP)

(73) Assignee: Matsushita Electric Industrial Co., Ltd., Osak (JP)

( * ) Notice: Subject to any disclaimer, the term of this patent is extended or adjusted under 35 U.S.C. 154(b) by 0 days.

(21) Appl. No.: 09/043,988

(22) PCT Filed: Sep. 5, 1997

(86) PCT No.: PCT/JP97/03146

§ 371 Date: Mar. 30, 1998

§ 102(e) Date: Mar. 30, 1998

(87) PCT Pub. No.: WO98/09823

PCT Pub. Date: Mar. 12, 1998

(30) Foreign Application Priority Data

| Sep. 9, 1996 | (JP) | 9-237464 |
| Mar. 25, 1997 | (JP) | 9-071353 |

(51) Int. Cl.[7] ................................................. G11B 11/00
(52) U.S. Cl. .................................... 369/275.4; 369/288
(58) Field of Search ............................. 369/275.1, 275.2, 369/275.3, 275.4, 288

(56) References Cited

U.S. PATENT DOCUMENTS

| 3,971,874 | 7/1976 | Ohta et al. . |
| 5,272,667 | 12/1993 | Yamada et al. . |
| 5,555,537 | 9/1996 | Imaino et al. . |
| 5,851,729 | * 12/1998 | Takeuchi et al. ................ 369/288 |
| 5,876,822 | * 3/1999 | Zhou et al. ...................... 369/288 |
| 5,958,649 | * 9/1999 | Hirotsune et al. ............... 369/288 |

FOREIGN PATENT DOCUMENTS

| 0 174 658 | 3/1986 | (EP) . |
| 61-68296 | 4/1986 | (JP) . |
| 61-148643 | 7/1986 | (JP) . |
| 62-88152 | 4/1987 | (JP) . |
| 62-143240 | 6/1987 | (JP) . |
| 63-102049 | 6/1988 | (JP) . |
| 2-125786 | 5/1990 | (JP) . |
| 4-21938 | 1/1992 | (JP) . |
| 4-212735 | 8/1992 | (JP) . |
| 5-182238 | 7/1993 | (JP) . |
| 6-150366 | 5/1994 | (JP) . |
| 8-87747 | 4/1996 | (JP) . |
| 8-180414 | 7/1996 | (JP) . |
| 9-326135 | 12/1997 | (JP) . |
| WO 96/31875 | 10/1996 | (WO) . |

OTHER PUBLICATIONS

Oct. 23, 1998 Communication from European Patent Office and attached Search Report.

* cited by examiner

*Primary Examiner*—Nabil Hindi
(74) *Attorney, Agent, or Firm*—Merchant & Gould P.C.

(57) ABSTRACT

An optical information recording medium provided with an information layer comprising at least Te, O and M atoms (wherein the M is at least one element selected from a metallic element, a metalloid element or a semiconductor element, most preferably Pd). The information layer comprises the O atoms in 40 atom %–60 atom %, the M atoms in 2 atom %–25 atom % and the Te atoms in 15 atom %–58 atom %, thus obtaining a preferable recording property having a high C/N ratio and a small jitter in a wide power margin in recording and reproducing information having a small b/d ratio (a ratio of a recording bit length b for a spot diameter d).

30 Claims, 10 Drawing Sheets

OPTICAL INFORMATION RECORDING MEDIUM, ITS MANUFACTURING METHOD, OPTICAL INFORMATION RECORDING/REPRODUCING METHOD AND OPTICAL INFORMATION RECORDER/REPRODUCER

FIELD OF THE INVENTION

The present invention relates to an optical information recording medium that can record and reproduce information signals having a high signal quality by irradiating a high-energy beam such as a laser beam to a thin film formed on a substrate, a method for manufacturing the optical information recording medium, a method of recording/reproducing and an apparatus for recording and reproducing.

BACKGROUND OF THE INVENTION

The technique for recording and reproducing information by irradiating a laser beam that is narrowed down into a minute spot onto a thin film that has been formed on a transparent substrate is well known. Recently, various examinations have been carried out enthusiastically in order to increase the quantity of information that can be processed per optical information recording medium by utilizing a technique for recording and reproducing information signals having a high signal quality by irradiating a high-energy beam such as a laser beam to a thin film formed on a substrate. The methods can be divided into two major categories.

A first method is to increase the quantity of information per unit area. A spot diameter of a laser beam is made smaller by shortening the wavelength of a laser beam or by increasing the numerical aperture of an objective lens that gathers the laser beam, thus enabling a smaller mark to be recorded and reproduced. Consequently, the recording density in the circumferential direction and radial recording density in a disk increase and the quantity of information that can be processed per medium increases. Furthermore, in order to improve the recording density in the circumferential direction, mark edge recording in which the length of a recording mark becomes information, and in order to improve the radial recording density, land and groove recording in which information is recorded in both a groove and a land for guiding a laser beam, have been invented and applied vigorously. As such techniques for a high density recording and reproducing progress, a thin film material that is suitable for the techniques and a disk structure using the material also have been developed.

As a second method, a medium having a multilayer structure in which the quantity of information processed per recording medium is doubled by laminating a plurality of layers recording and reproducing information and a method of recording and reproducing in the medium have been proposed (for example, in Japanese Patent Application No. Hei 07-82248). Many thin film materials are also proposed as a recording material suitable for the recording medium having a multilayer structure, but a recording medium in which a favorable recording property can be obtained when only one layer is used is basically used as it is in many cases.

In an optical information recording medium (wherein the information layer is a single layer) utilizing a technique for recording and reproducing information signals having a high signal quality by irradiating a high-energy beam such as a laser beam, a thin film material whose main component is $TeO_x$ ($0<x<2$), that is a mixture of Te and $TeO_2$, is provided on a substrate (Unexamined Japanese Patent Publication (Tokkai Sho) 50-46317). This kind of recording media can change a reflectance greatly in irradiating an optical beam for reproducing.

However, it takes some time in $TeO_x$ till a signal is saturated after recording, i.e. till a laser beam irradiated part in a recording thin film is crystallized sufficiently. This is not suitable for a recording medium in which a rapid response is required as in the case of a data file for a computer in which, for example, data are recorded in a disk and then verified after one rotation, or the like.

A recording medium in which, for example, Pd is added to $TeO_x$ as a third element in order to alleviate the disadvantage mentioned above is proposed in Unexamined Japanese Patent Publication (Tokkai Sho) 61-68296. The Te and the Pd act as a metal sensing a beam and the $TeO_x$ acts for maintaining an oxidation resistance. The $TeO_x$ is present as a matrix (sea) component and the Te and the Pd are present as an island component. It is conceivable that the Pd functions as a crystalline nucleus that promotes crystal growth of the Te at the time of irradiating a laser beam in a $TeO_x$ thin film. According to this function, crystal grains of Te or a Te—Pd alloy in which crystallization is further advanced are generated at high speed. As a result, it enables a crystallization recording at high speed, thus obtaining a rapid response as mentioned above. Furthermore, the moisture resistance of the $TeO_x$ thin film is not damaged, since the Pd has a high oxidation resistance.

However, a further improvement in recording density has come to be required according to the recent tendency toward mass storage of information. Consequently, a development of a recording medium that can correspond to high density recording using an optical system having a short wavelength/high NA has come to be required. That is to say, deterioration of a recording and reproducing property such as, for example, decrease of a C/N ratio and increase of jitter was found when trying to record information in a higher density recording than the experimental condition shown in the Publication mentioned above in many parts in a composition range of an optical information recording medium mentioned in the Publication in which Pd is added into $TeO_x$. The C/N ratio mentioned above means a ratio of carrier/noise in a signal having a specific frequency.

The reason for the deterioration is considered to occur as follows. In the case of higher density recording and reproducing using the same optical system, a sufficient recording property cannot be obtained, if a thermal conductivity of a recording thin film does not fall in a predetermined range. That is, when the thermal conductivity of a recording thin film is too low, the heat is difficult to spread from the part heated by a laser beam and a recording mark can not be enlarged even if recording power is increased. Consequently, the sensitivity is low and the C/N ratio also tends to decrease. On the contrary, when the thermal conductivity of a recording thin film is too high, the heat is easy to spread from the part heated by a laser beam and a recording mark is enlarged by increasing the recording power a little. Consequently, the sensitivity is high and the C/N ratio also tends to increase. However, the edge of the recording mark easily becomes blurry. Adjacent marks begin to run together when increasing the recording power of a laser beam even slightly beyond the optimum power and the C/N ratio decreases. Therefore, the power margin is narrow and there is a problem in a practical use. It is conceivable that in recording and reproducing in the same optical system the problem becomes significant, as the density becomes high by narrowing the space between marks. Even if a high C/N ratio is obtained, it does not always mean that few bit errors occur. Thermal interference tends to be generated between the recording marks, for example, in the case where a recording thin film has a high thermal conductivity as mentioned above. As a result, it is conceivable that the position of the recording marks to be detected changes and many bit errors occur even in the cam of a high reflectance change and a high C/N ratio. It can be considered that this becomes more prominent in a mark edge recording method that is in wide use recently. An evaluation of a jitter is used as a means for evaluating the amount of bit errors relatively easily. The jitter means a deviation on a time base between an original signal for recording and a reproduced signal.

In the present specification, the value obtained by dividing the sum ($\sigma_{sum}$) of standard deviation of a jitter in each signal by a window width (T) of signal detection is indicated as a "jitter ($\sigma_{sum}$/T)", and the value is determined by measurement.

For example, it is well known that a jitter of 12.8% or less is corresponding to a bit error rate of $10^{-4}$ or less in the case of assuming that the deviation on a time base mentioned above is distributed normally.

The recording conditions in the Publication mentioned above are described as follows: a laser wavelength of 830 nm; a wavelength limitation of 0.8 $\mu$m; a rotational frequency of 1800 rpm; a recording position (radius) of 75 mm; and a recording frequency of 5 MHz. In this case, it is conceivable by taking the technical background at the time the invention was made in Shouwa 61 (1986) into consideration that a marking position recording method was used. Therefore, the shortest marking space is 2.83 $\mu$m and the bit length b is determined as 1.89 $\mu$m by dividing the shortest marking space by a bit density of 1.5 under the condition of a linear velocity of 14.1 m/s calculated from the radial position and the rotational frequency mentioned above.

It is conceivable that the wavelength limitation of 0.8 $\mu$m mentioned in the identical Publication has been calculated using a lens NA of 0.5, when taking it into consideration that beam intensity of a laser beam can be approximated by a Gaussian distribution usually and that it has been common at that time to define a diameter in which a beam intensity is a half of that in a spot center as the wavelength limitation.

When beam intensity of a laser beam can be approximated by a Gaussian distribution and a spot diameter d is defined as a diameter in which the beam intensity is 1/e of that in a spot center, the spot diameter d is 1.01 $\mu$m. Thus, the ratio (b/d) of a bit length b for a spot diameter d is 1.87. In the Publication mentioned above, it is mentioned that a high C/N ratio, at least 50 dB under the condition of b/d=1.87 and about 60 dB depending on the composition, is obtained.

However, the recording capacity required for a recording medium has doubled in a few years recently and the ratio b/d mentioned above is necessary to be lowered greatly. The case of recording information signals of about 4 times of CD-ROM, i.e. 2.6 gigabyte, in a disk in which a film is formed on a substrate having the same size as a CD-ROM is considered as an example. In this case, the shortest mark length is 0.62 $\mu$m under the condition of a groove pitch of 1.48 $\mu$m when recording in both a groove and a land in a mark edge recording method. Consequently, the bit length b is 0.41 $\mu$m, calculated by dividing the shortest mark length by a bit density of 1.5. In the case of using an optical system (for example, a wavelength of 680 nm and a NA of 0.6) that has been technically established recently and mass-produced, the spot diameter d is 0.59 $\mu$m. Therefore, the b/d is about 0.6 under the condition mentioned above. The b/d is remarkably low under this condition compared to that in the Publication mentioned above, and an preferable recording property is not always exhibited under this condition even in the case of using the recording medium in the Publication as it is.

Therefore, in order to obtain a preferable recording property having a high C/N ratio and a small jitter in a wide power margin in recording and reproducing with a small b/d and higher density, the composition of the recording film mentioned in the Publication can not be applied as it is. It is considered that the composition of the recording thin film suitable for that is necessary to be reevaluated in the relationship with recording conditions.

Moreover, in obtaining a multilayer-recording medium in which a plurality of layers for recording and reproducing information are laminated, recording sensitivity is a critical issue, and transmittance and reflectance of a film also are necessary to be designed most suitably. That is to say, in a medium having a multilayer structure, especially the first information layer that is the first layer from the side into which a laser beam enters is required to have a high transmittance for recording and reproducing information with a sufficient power for the second information layer that is the second layer from the side. A high reflectance is also required to obtain a sufficient quantity of reflected light also from the first information layer itself. Consequently, absorption of the first information layer is lowered inevitably, resulting in difficulty of securing sufficient recording sensitivity. The level of recording density in each layer in a medium having a multilayer structure capable of recording that has been reported is lower than the current level mentioned above. As a result, an increase in the quantity of information that can be processed per recording medium can not be attained. It is also difficult to be attained using a semiconductor laser that can be mass-produced, since, for example, the laser power is required to be at least 20 mW in order to obtain a sufficient reflected light by recording signals in both of the two layers.

As far as the conventional example of a $TeO_x$ type recording thin film is concerned, it has been confirmed that the material is suitable for use as a medium capable of recording only for a thick film having a film thickness of about 120 nm as described in the reference or the like, which is very thick and hardly transmits a laser beam. Therefore, in order to use a film as the first information layer of a recording medium having a multilayer structure as mentioned above, the film is necessary to transmit a laser beam greatly. The recording property in such an area is unknown, and it is necessary to attain high density and high sensitivity for the preferable recording property.

SUMMARY OF THE INVENTION

In order to solve the conventional problem mentioned above, the object of the present invention is to provide an optical information recording medium, a method for manufacturing the same, a method of recording and reproducing optical information and an apparatus for recording and reproducing optical information, in which a preferable recording property having a high C/N ratio and a small jitter can be obtained with a wide power margin in recording and reproducing information having a small b/d ratio (a ratio of a recording bit length b for a spot diameter d).

In order to attain the object mentioned above, an optical information recording medium according to the present invention is provided with an information layer comprising at least Te, O and M atoms (wherein the M is at least one kind of atom selected from a metallic element, a metalloid element or a semiconductor element), and is characterized by comprising the O atoms by 40 atom %–60 atom %, the M atoms by 2 atom %–25 atom % and the Te atoms by 15 atom %–58 atom % in the information layer. According to the recording using the optical information recording medium, an optical information recording medium can be realized, in which a preferable recording property having a high C/N ratio and a small jitter can be obtained with a wide power margin in recording and reproducing information having a small b/d ratio (a ratio of a bit length b for a spot diameter d).

In the recording medium of the present invention, the film thickness of the information layer is preferably 10 nm–200 nm. The film functions as an information recording medium when its thickness is 10 nm or more, and the film is advantageous in view of cost when the thickness is 200 nm or less. More preferably, the film thickness of the information layer is 10 nm–70 nm. In this range, the film is particularly practical.

In the recording medium of the present invention, it is preferable that an overcoat layer is further provided on the information layer, since the information layer can be protected by the overcoat layer.

In the recording medium of the present invention, it is preferable that two information recording media having an information layer on a transparent substrate are integrated through an adhesion layer with the information layers positioned on the inside, and at least one of the information layers is preferably an information layer according to claim 1. The recording capacity can be increased by using a multilayer structure.

In the recording medium of the present invention, it is preferable that a plurality of information layers are further provided on an information layer through a separating layer and the information layer nearest to the substrate is an information layer according to claim 1. Similarly, the recording capacity can be increased by using a multilayer structure.

In the recording medium of the present invention, it is preferable that the film thickness of the information layer nearest to a substrate is 10 nm–50 nm. In the case of using a multilayer structure, a laser beam is irradiated from the side of a substrate. Therefore, the film thickness of the information layer is preferably thin in order to prevent light transmittance from decreasing.

In the recording medium of the present invention, it is preferable that the light transmittance of the information layer nearest to a substrate is at least 40%. When the light transmittance is at least 40%, recording and reproducing are possible also in the second information layer by irradiating a laser beam from the side of the substrate. In this case, the light transmittance is obtained by measuring the value in the wavelength of a laser beam used for recording and reproducing by a spectroscope or the like. For example, it is measured by irradiating a beam having a wavelength of 680 nm.

In the recording medium of the present invention, it is preferable that the thickness of the overcoat layer is in the range of 2–100 $\mu$m. In this range of the thickness, the overcoat can exhibit its function as a protective layer.

In the recording medium of the present invention, it is preferable that the thickness of the adhesion layer is in the range of 2–100 $\mu$m. Similarly, in this range of the thickness, the adhesion layer can exhibit its function and a shield can be provided sufficiently between the first information layer and the second information layer.

In the recording medium of the present invention, it is preferable that the thickness of a separating layer is at least the depth of focus in which adjacent information layers can be defined as $\Delta Z = \lambda / \{2(NA)^2\}$, wherein an optical beam having a wavelength of $\lambda$ is irradiated through an object lens having a numerical aperture of NA. In this case, a shield can be provided sufficiently between the first information layer and the second information layer. More concretely, the thickness of the separating layer is preferably in the range of 2–100 $\mu$m.

In the recording medium of the present invention, it is preferable that the M atom is at least one kind of atom selected from at least one metallic element selected from Al, Sc, Ti, V, Cr, Mn, Fe, Co, Ni, Cu, Zn, Ga, Y, Zr, Nb, Mo, Tc, Ru, Rh, Pd, Ag, Cd, In, La, Ce, Pr, Nd, Pm, Sm, Eu, Gd, Th, Dy, Ho, Er, Tm, Yb, Lu, Hf, Ta, W, Re, Os, Ir, Pt, Au, Hg, Tl and Pb, at least one metalloid element selected from B, C, As, Se, Sb and Bi and at least one semiconductor element selected from Si, Ge and Sn. The single component of the Te oxide [$TeO_x (0<x<2)$] used in the present invention alone is not suitable as a practical recording medium, since it takes a few minutes for marks to be enlarged enough, i.e. for crystallization to proceed completely, in some cases. Therefore, crystallization is promoted by adding the M atom mentioned above as a third element, thus allowing the crystallization to be completed within tens of $\mu$ sec (the time required for one revolution of a disk). It takes time for a crystal structure of helical Te to grow. However, addition of an M atom such as Pd or the like mentioned above results in crosslinking and crystallization proceeds at high speed. Particularly, an M atom is preferably Pd, since a Pd atom is excellent especially in crystallization at high speed.

Furthermore, in the recording medium of the present invention, it is preferable that the O atom in an information layer is comprised at a ratio of more than 45 atom % but not more than 60 atom %, since it is a suitable volume as a matrix (sea) component and is excellent for the oxidation resistance of a recording layer.

Next, in the method of recording and reproducing according to the present invention, an optical information recording medium provided with an information layer made of a thin film material comprising at least Te, O and M atoms (wherein the M is at least one kind of element selected from a metallic element, a metalloid element or a semiconductor element) on a transparent substrate is irradiated by an optical beam from the side of the transparent substrate, thus recording and reproducing information signals. In the case where the optical beam mentioned above is irradiated to the optical information recording medium through an object lens, when beam intensity distribution can be approximated by a Gaussian distribution and a diameter for which the beam intensity is 1/e of that in a spot center is defined as a spot diameter, the spot diameter is indicated by d and the length of a recording bit is indicated by b. The method of recording and reproducing according to the present invention is characterized by recording and reproducing under the condition that the ratio (b/d) of the bit length b for the spot diameter d is 0.7 or less. According to this method of recording and reproducing, a method of high-density information recording and reproducing can be realized.

In the method of recording and reproducing, in the case of modulating the intensity of an optical beam at least within the following power levels (P1>P2$\geq$P3$\geq$0): a power level P1 that is sufficient for crystallizing an irradiated part also in the case of irradiating while modulating the beam; and power levels P2 and P3 that do not crystallize an irradiated part also in the case of irradiating the beam without modulating, and in the case of forming marks at least longer than the shortest mark among the marks having some different lengths to be recorded, it is preferable that a pulse shape for forming a mark is a recording pulse train made of a plurality of pulse trains that have been modulated between the power levels P1 and P3 and the part where no mark is formed is kept constant with the power level P2. This method enables more accurate recording as shown in FIG. 6 explained later.

In the method of recording and reproducing, it is preferable that the power level 1 also has a power enabling an irradiated part to be melted instantaneously in the case of irradiating while modulating a beam. This method enables more accurate recording by melting crystallization.

In the method of recording and reproducing, it is preferable that at least each pulse except the first pulse and the last pulse has the same width and is a rectangular pulse, and that each space between the rectangular pulses is also equivalent. In this method, only one kind of a basic clock signal for a pulse modulation is required and the pulse can be controlled merely by increasing or decreasing the number of pulses, resulting in easy control.

In the method of recording and reproducing, it is preferable that a cooling section for the power level P3 is provided right after the last pulse in a recording pulse train, which prevents the rear end of the part melted by an irradiation of a laser beam from being overheated.

Next, in an apparatus for recording and reproducing of the present invention, an optical information recording medium provided with an information layer comprising at least Te, O and M atoms (wherein the M is at least one kind of element selected from a metallic element, a metalloid element or a semiconductor element) on a transparent substrate is irradiated by an optical beam from the side of the transparent substrate, thus at least recording information signals. In the case of at least recording a bit string of the information signals by irradiating the optical beam mentioned above to the optical information recording medium through an object lens, when the beam intensity distribution can be approximated by a Gaussian distribution and a diameter in which the beam intensity is 1/e of that in a spot center is defined as a spot diameter, the apparatus for recording and reproducing is characterized by being provided with a modulation means that modulates intensity of the optical beam so that the ratio (b/d) of the bit length b for the spot diameter d is 0.7 or less.

In the apparatus for recording and reproducing, in the case of modulating the intensity of an optical beam at least within the following power levels (P1>P2≧P3≧0): a power level P1 that is sufficient for crystallizing an irradiated part also in the case of irradiating while modulating the beam; and power levels P2 and P3 that do not crystallize an irradiated part also in the case of irradiating the beam without modulating, and forming at least a mark longer than the shortest in the marks having some different lengths to be recorded, it is preferable that a modulation means is provided for modulating the intensity of the optical beam so that a pulse shape for forming a mark is a recording pulse train made of a plurality of pulse trains that have been modulated between the power levels P1 and P3 and the part where no mark is formed is kept constant with the power level P2.

In the apparatus for recording and reproducing, it is preferable that the power level 1 also has a power enabling an irradiated part to be melted instantaneously in the case of irradiating while modulating a beam. In the apparatus for recording and reproducing, it is also preferable that each pulse except at least the first pulse and the last pulse has the same width and is a rectangular pulse, and that each space between the rectangular pulses is also equivalent.

Furthermore, in the apparatus of recording and reproducing, it is preferable that a cooling section for the power level P3 is provided right after the last pulse in a recording pulse train.

Next, a method for manufacturing an optical information recording medium according to the present invention is characterized in that using a thin film material comprising Te, O and an element M (wherein the M is at least one kind of atom selected from a metallic element, a metalloid element or a semiconductor element), an information layer comprising O atoms by 40 atom %–60 atom %, M atoms by 2 atom %–25 atom % and Te atoms by 15 atom %–58 atom % is formed on a transparent substrate by a vapor phase thin film deposition. According to this manufacturing method, the information recording medium can be manufactured effectively and reasonably.

In the manufacturing method, it is preferable that an overcoat layer is further formed by hardening through irradiation of an energy beam after coating with an energy beam hardened resin on an information layer. For example, ultraviolet rays can be used as an energy beam.

In the manufacturing method, it is preferable that two information recording media having an information layer on a transparent substrate are prepared and integrated by applying an energy beam hardened resin or a hot-melt adhesion layer between the two media with each information layers positioned on the inside.

In the manufacturing method, it is preferable that a separating layer is further formed by hardening through irradiation of an energy beam after coating with an energy beam hardened resin on an information layer and the second information layer is further formed thereon.

In the manufacturing method, it is preferable that the information layer comprises the O atoms by 40 atom %–60 atom % and the M atoms by 2 atom %–25 atom %.

In the manufacturing method, it is preferable that the film thickness of the information layer is 10 nm–50 nm.

BRIEF DESCRIPTION OF THE DRAWINGS

FIG. 6 shows a waveform drawing of an embodiment of a pulse shape that can be applied for recording according to the present invention.

FIG. 7 shows a method for manufacturing an optical information recording medium according to an embodiment of the present invention.

DETAILED DESCRIPTION OF THE INVENTION

Figure 1:
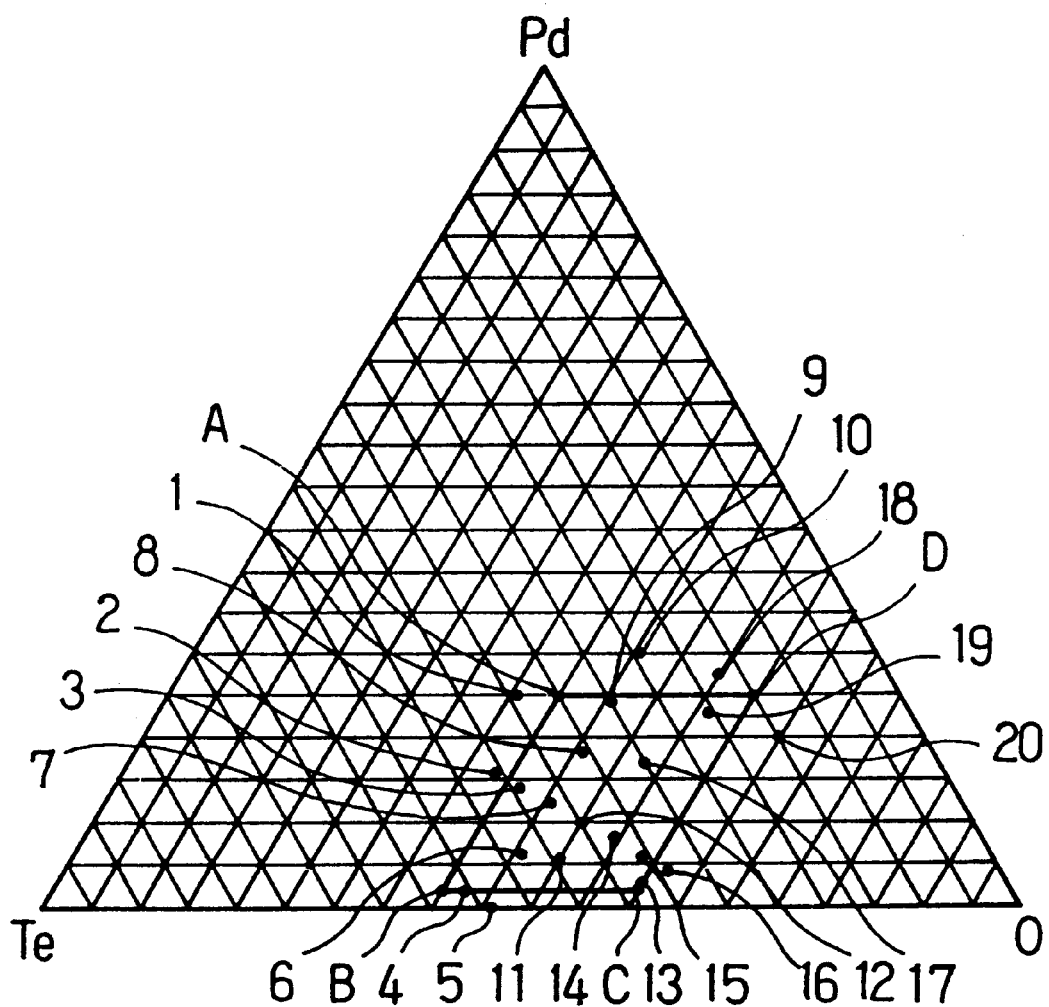
FIG. 1 shows a range of a recording thin film composition in an optical information recording medium according to claim 1 of the present invention.

Embodiments according to the present invention will be explained referring to the drawings as follows. FIG. 1 shows a composition graph of a ternary compound system of Te—O—Pd. An area surrounded by A, B, C and D in FIG. 1 shows a composition range of a recording thin film in an optical information recording medium according to the present invention. The process leading to the conclusion that the composition ranges are most suitable for attaining the object of the present invention will be described in detail later.

Figure 2:
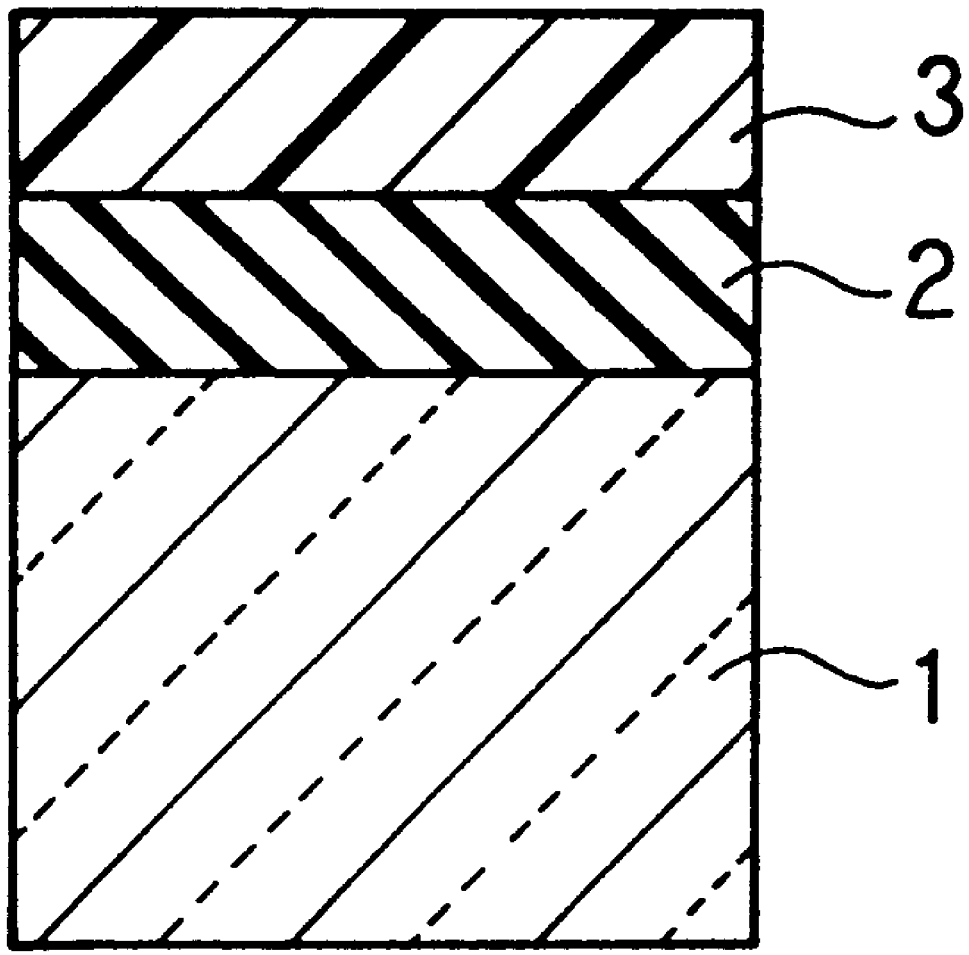
FIG. 2 shows a schematic cross sectional view of an optical information recording medium according to an embodiment of the present invention.

FIG. 2 shows a cross sectional view of a configuration example of an optical information recording medium according to the present invention. In FIG. 2, 1 indicates a transparent disk substrate, 2 is a recording thin film that is an information layer made of a thin film material comprising Te, O and M (wherein the M is at least one kind of element selected from a metallic element, a metalloid element or a semiconductor element) and 3 is an overcoat layer.

A polycarbonate resin, a polymethyl methacrylate resin, a polyolefin resin, an ARTON (trade mark; Japan Synthetic Rubber Co., Ltd.) resin, glass or the like can be used as a material of the transparent substrate 1. The thickness of the transparent substrate 1 is not especially defined, but a transparent substrate having a thickness of about 0.3–1.5 mm can be used.

The recording thin film 2 can be formed by a normal vapor phase thin film deposition such as, for example, a vacuum evaporation method, a sputtering technique, ion plating, a CVD (Chemical Vapor Deposition) method, a MBE (Molecular Beam Epitaxy) method or the like.

Figure 3:
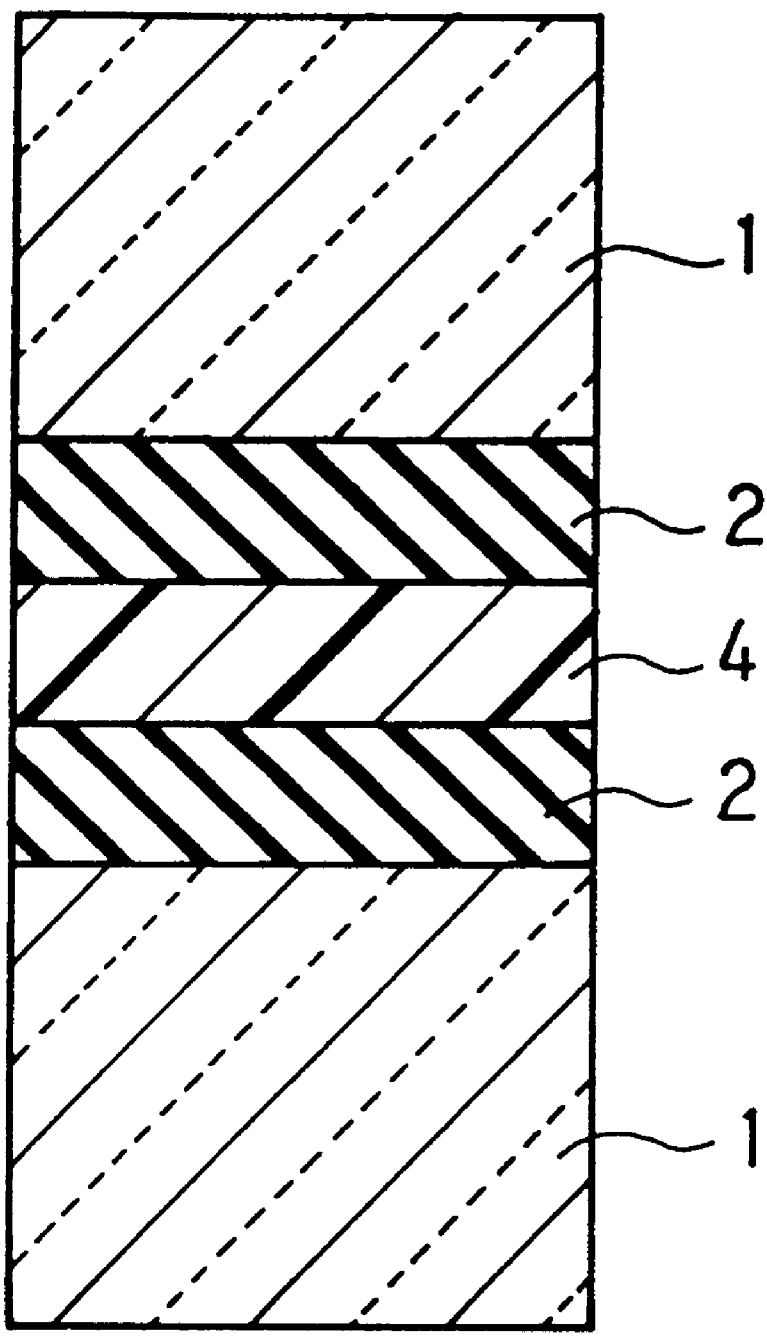
FIG. 3 shows a schematic cross sectional view of an optical information recording medium according to another embodiment of the present invention.

The optical information recording medium of the present invention may be used as a single plate disk by overcoating with a resin hardened by ultraviolet rays as shown in FIG. 2, or as a two-sided disk by laminating with an adhesive 4 of a resin hardened by ultraviolet rays or a hot-melt type as shown in FIG. 3.

In the optical information recording medium of the present invention, a dielectric protective layer such as, for example, a ZnS-SiO2 mixed material may be provided suitably on any one side of a substrate side or an opposite side to the substrate of the recording thin film or on the both sides as needed for the purpose of restraining the increase of noise caused by thermal damage in the recording thin film or the like.

In the optical information recording medium of the present invention, for example, a reflective layer made of metal such as Au, Al or the like or an alloy material based thereon is such metals may be provided on the opposite side to the substrate of the recording thin film as needed for the purpose of improving absorptance and optical reflectance, reducing a thermal load in a recording thin film or the like.

Figure 4:
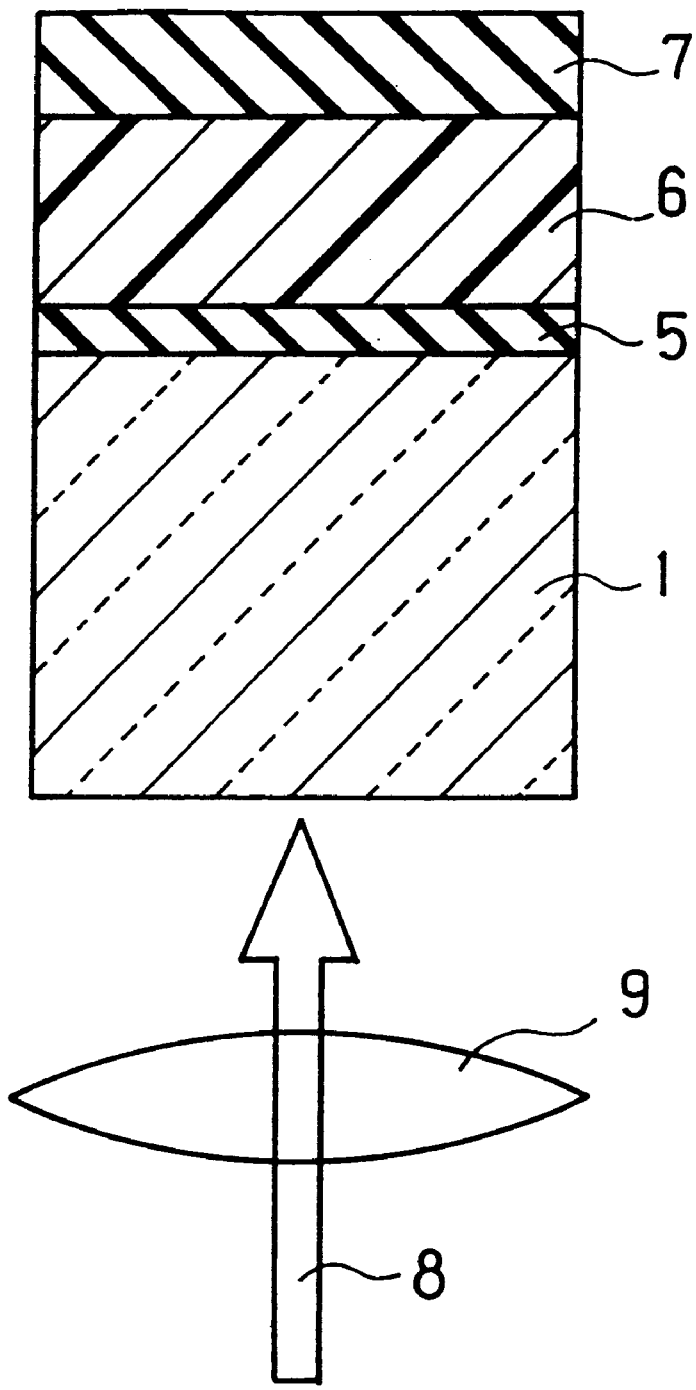
FIG. 4 shows a schematic cross sectional view of an optical information recording medium according to still another embodiment of the present invention.

FIG. 4 shows a cross sectional view of a configuration example of an optical information recording medium having a plurality of information layers according to the present invention. In FIG. 4, 1 indicates a transparent substrate, 5 is a first information layer made of a recording thin film whose main components are Te, O and M, 6 is a separating layer, and 7 is a second information layer. Information is recorded and reproduced by irradiating a laser beam 8 from the side of the transparent substrate 1 through an object lens 9.

A polycarbonate resin, a polymethyl methacrylate resin, a polyolefin resin, an ARTON resin, glass or the like can be used as a material of the transparent substrate 1. The thickness of the transparent substrate 1 is not especially defined, but a transparent substrate having a thickness of about 0.3–1.5 mm can be used.

The first information layer 5 and the second information layer 7 can be formed by a normal vapor phase thin film deposition such as, for example, a vacuum evaporation method, a sputtering technique, ion plating, a CVD (Chemical Vapor Deposition) method, a MBE (Molecular Beam Epitaxy) method or the like.

A main role of the atom M mentioned above is to suppress the phenomenon of taking time to saturate signal strength after recording in the first information layer 2 by laser heating. For that purpose, almost all metallic elements including a metalloid and a semiconductor can be applied, though there is a difference in effect. Particularly, a noble metal is favorable in moisture resistance and corrosion resistance, since it is excellent in an oxidation resistance. More particularly, Pd, Au or the like is favorable for increasing signal strength.

In order to utilize the laser beam 8 effectively, the material of the separating layer 6 is preferably a material having a low absorption for the light transmitted through especially the first information layer 5 in a wavelength range of the laser beam 8. Therefore, a transparent adhesive or a resin, glass material or the like as well as the substrate material also can be used.

It is required that the thickness of the separating layer 6 is at least the same as the depth of focus ($\Delta Z$) that is determined by a numerical aperture NA of the objective lens 9 and a wavelength $\lambda$ of the laser beam 8 so that crosstalk from another information layer is decreased at the time of reproducing information in an information layer. In this case, the depth of focus ($\Delta Z$) generally can be approximated by the following formula (Formula 1) when the depth of focus ($\Delta Z$) is defined as the distance between a just-focus-point on an optical axis of a laser beam in the case of no aberration and a point at which the intensity of the laser beam is 80% for the just-focus-point.

$$\Delta Z = \lambda / \{2(NA)^2\} \qquad \text{(Formula 1)}$$

For example, in the case of $\lambda$=680 nm and NA=0.60, $\Delta Z$ is 0.944 $\mu$m. Therefore, since within ±1.0 $\mu$m is within the depth of focus, in the case of using this optical system, it is preferable to set the thickness of the separating layer 6 to the value at least more than 2.0 $\mu$m and the upper limit is preferably 100 $\mu$m.

In order to enable information having high density to be recorded and reproduced in two information layers, it is necessary that the thickness of the separating layer 6 is within the tolerance of the base material thickness that is within the tolerance of the object lens with additional thickness of the transparent substrate 1 so that the distance between the two layers is in the range that the object lens 9 can gather rays of light.

The first information layer 5 comprising Te, O and M may be suitably provided with: a dielectric protecting layer made of, for example, a mixed material of ZnS-SiO$_2$ or the like for the purpose of restraining the increase of noise caused by thermal damage of a recording film or controlling the optical reflectance, the light transmittance or the like; a reflective layer made of a metal such as Au, Al or the like, or an alloy material based on them for the purpose of improving the optical reflectance, decreasing thermal load in the recording thin film and the like as required in either or both sides of the substrate of the recording thin film in the first information layer 5 and/or the opposite side of the substrate.

The second information layer 7 can be any medium of a rewriting type capable of recording, erasing and reproducing information, a write once type capable of recording and reproducing information and a reproducing exclusive type capable of reproducing information having been stored. In this principle, a plurality of various statuses detected optically or magnetically are processed as information signals.

It is also possible to provide further a third information layer to record and reproduce information therein, i.e. it is possible to obtain a multilayer recording medium having 3 layers or more in the case where the second information layer 7 is a thin film comprising TE-O-M as main components as in the first information layer 5 and the film thickness enables proper optical reflectance and light transmittance to be obtained.

The quantity of information that can be processed per medium can be further doubled by making a double-sided structure through laminating the two media mentioned above having a multilayer structure with the sides of the second information layer 7 of each media facing each other.

In the disk structure mentioned above, signals having a high quality are, of course, recorded and/or reproduced in any information layer, and it is preferable also in view of the structure of a reproducing unit that the signal level from each layer is equivalent. In order to attain it, an optical design is required that enables the quantity of reflected light obtained from each layer to be equivalent. This optical design will be explained as follows.

In the case of the first information layer 5 alone, the optical reflectance and the light transmittance are indicated by R1 and T1 respectively. In the case of the second information layer 7 alone, the optical reflectance is indicated by R2. The optical reflectance r2 of a medium in reproducing information in the second information layer 7 indicates an optical reflectance obtained by the laser beam 8 being transmitted through the first information layer 5, reflected by the second information layer 7 and transmitted through the first information layer 5 again. The optical reflectance r2 is preferably equivalent to an optical reflectance r1 of the medium in reproducing information in the first information layer 5. Here, the relationship between r1 and r2 is expressed by the following formula (Formula 2).

$$r1 = R1, \quad r2 = T1^2 \times R2 \qquad \text{(Formula 2)}$$

It is ideal that r1 and r2 are equivalent, but in practice, generally there is a certain tolerance that, for example, the ratio (K) of r1 for r2, K=r1/r2, is 0.2<K<5.0. The material, the composition and the film thickness may be selected so that the optical reflectance and the light transmittance fall in the tolerance. In the case where each layer is an information layer capable of recording, it is necessary to make an optical design so that the values of K in all cases do not exceed the tolerance, since the optical reflectance and the light transmittance in each layer vary before and after recording.

Figure 5:
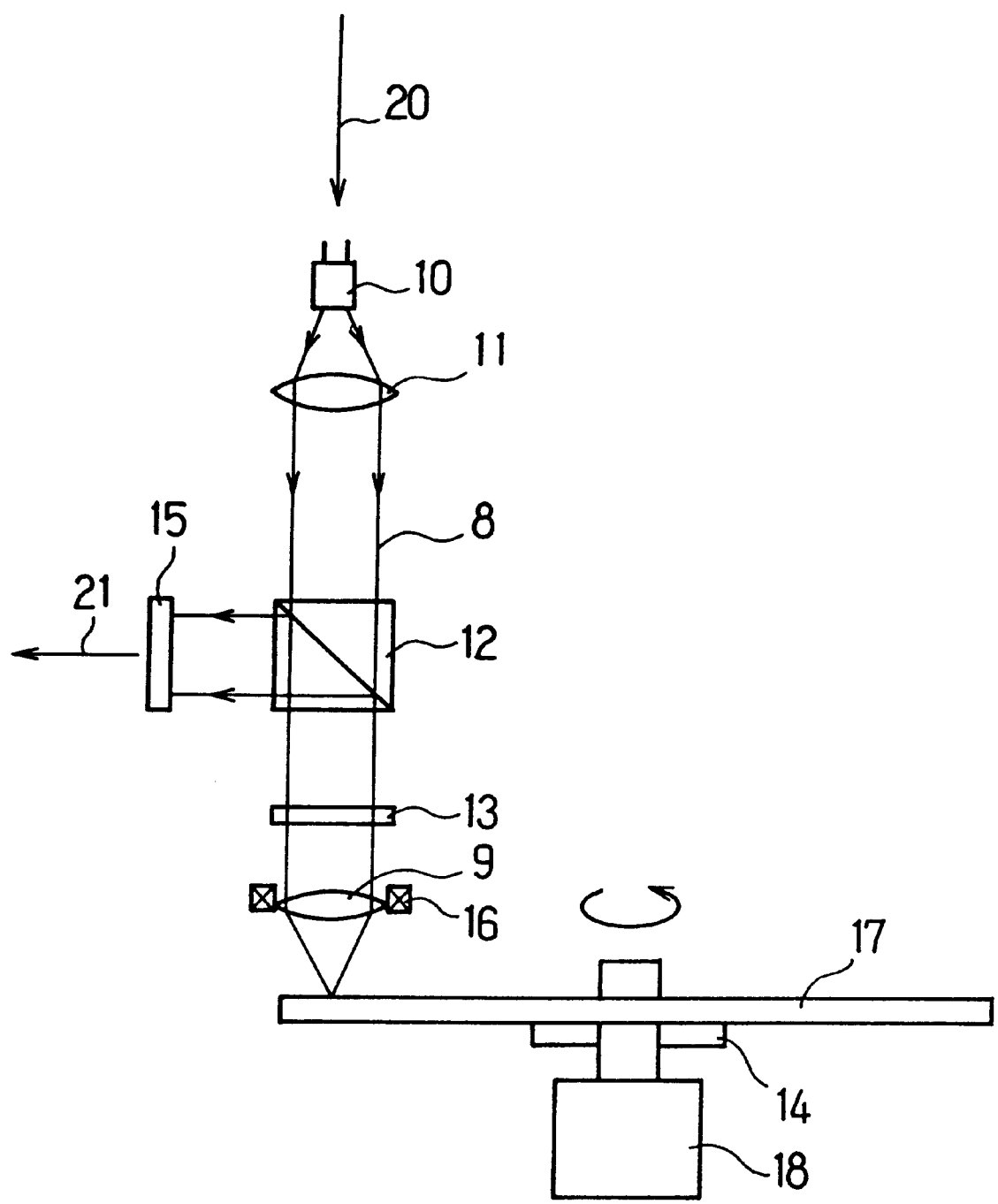
FIG. 5 shows a drawing of an apparatus of recording and reproducing an optical information recording medium according to an embodiment of the present invention.

FIG. 5 shows a schematic drawing of an apparatus for recording and reproducing in an optical information recording medium according to the present invention. A laser beam 8 emitted by a semiconductor laser 10 is gathered at a collimator lens 11, resulting in parallel rays. The parallel rays are focused on an optical disk 17 by shifting the object lens up and down using a voice coil 16 through a beam splitter 12, a λ/4 wave plate 13 and an object lens 9. The optical disk 17 is fixed on a turntable 14 and is rotated by a motor 18, thus recording information signals. The numerals 20 and 21 indicate an input signal and a reproduced output signal respectively.

In recording the information signals, the intensity of a laser beam is modulated at least within the following power levels: a power level P1 that is sufficient for crystallizing an irradiated part in the case of irradiating while modulating the beam; and power levels P2 and P3 that do not crystallize an irradiated part in the case of irradiating the beam without modulating (P1>P2≧P3≧0).

In the case of forming at least a mark longer than the mark that is shortest in the marks having a various length to be recorded, a pulse shape for forming a mark is a recording pulse train made of a plurality of pulse trains that have been modulated between the power levels P1 and P3 and the part where no mark is formed is kept constant with the power level P2.

Figure 6A:
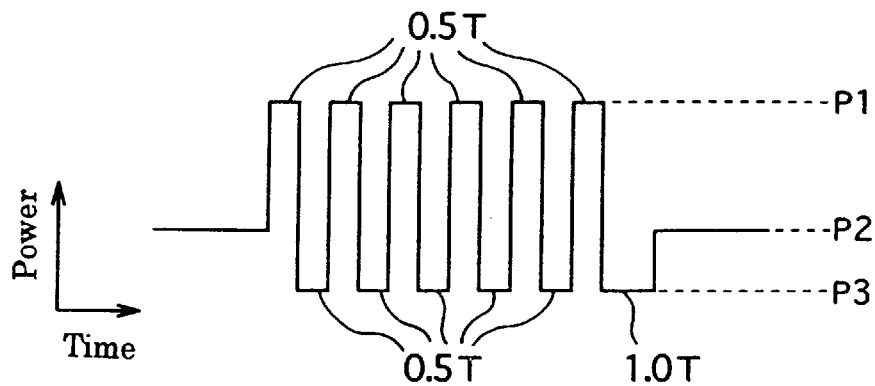
FIG. 6A, FIG. 6B and FIG. 6C show a waveform drawing of an example in the case of recording 7T marks, another waveform drawing in the case of recording 7T marks and a still another waveform drawing in the case of recording 7T marks respectively.
Figure 6B:
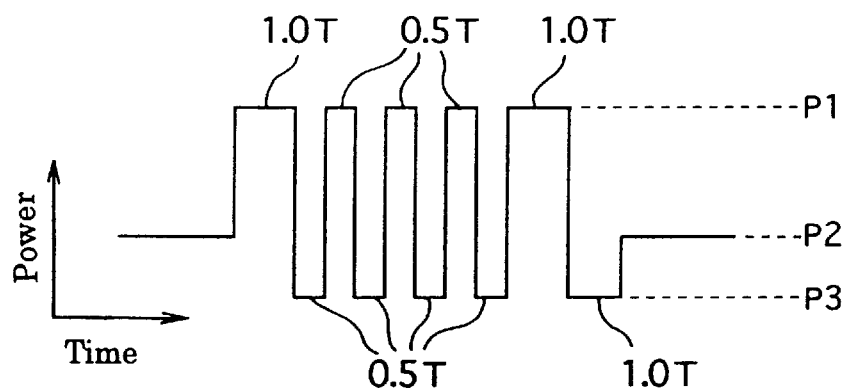
Figure 6C:
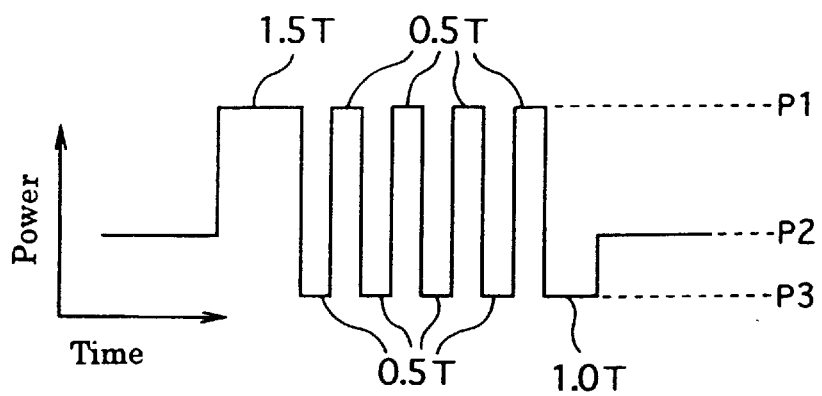

In FIG. 6, some examples of a waveform in the case of recording 7T marks in the recording pulse train are shown. In an embodiment according to the present invention, a pulse shown in FIG. 6A is used, but a pulse shown in FIG. 6B and FIG. 6C or other waveform patterns also can be used.

In the case of reproducing this information signal, a continuous light having a reproducing power P4 is irradiated to an optical disk as in recording, and its reflected light enters a detector 15. Then the change in the quantity of the reflected light is detected as a reproduced signal.

In the case of recording and reproducing information in an optical information recording medium provided with a plurality of information layers as shown in FIG. 4, a layer recognition means, a layer changing means and the like are required in order to record or reproduce information by selecting any one of a plurality of information layers. This is described in, for example, Japanese Patent Application No. Hei 07-82248 and has been mounted in, for example, a recording and reproducing apparatus of an optical disk DVD exclusively for reproducing that has been already marketed. Therefore, a layer recognition means, a layer changing means and the like that have been established technically can be used.

Figure 7A:
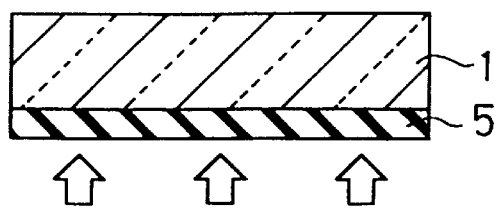
FIG. 7A, FIG. 7B and FIG. 7C show a first process for forming a film, a second process for forming a film and a laminating process respectively.
Figure 7B:
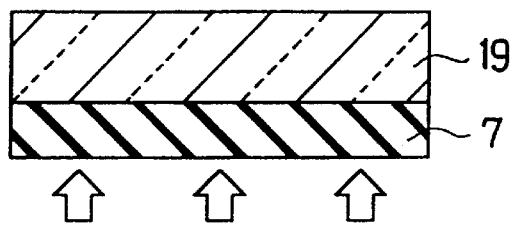
Figure 7C:
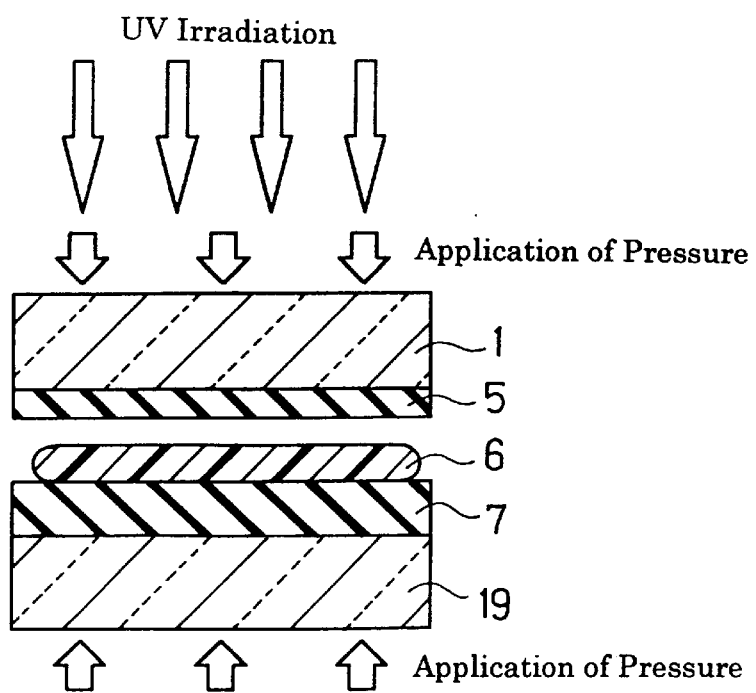

Next, a typical method for manufacturing an optical information recording medium according to the present invention will be explained. FIG. 7 is a drawing showing the process. As the first process of making a film (FIG. 7A), a first information layer 5 that is a film comprising Te, O and a metal element M is formed on the first substrate 1 by the method mentioned above so as to have a film thickness in the range of 10 nm–50 nm and the composition rate of O atoms and M atoms in the range of 40 atom %–60 atom % and 2 atom %–25 atom % respectively. Similarly, as the second process of making a film (FIG. 7B), the second information layer 7 is formed on the second substrate 19. As a laminating process (FIG. 7C), an adhesive material such as an ultraviolet curable resin or the like is applied on the film surface of either one of the first or the second substrate, which is laminated with the film surface of another substrate facing. If necessary, the adhesive material is hardened by a predetermined method such as an irradiation of a beam such as an ultraviolet ray or the like from the side of any one of the substrates, thus forming a separating layer 6. For the purpose of forming a film in one process or the like, the following method is also possible: after forming the first information layer 5, the separating layer 6 and the second information layer 7 on either the first substrate 1 or the second substrate 19, another substrate is laminated with the substrate.

(Embodiment 1)

On a transparent substrate made of polycarbonate resin having a thickness of 0.6 mm provided with grooves having a groove pitch of 1.48 μm for guiding a laser, a recording thin film of about 40 nm made of Te, O and Pd was deposited by a sputtering technique using single material targets (a diameter of 4 inches and a thickness of about 6 mm) of both Te and Pd in an atmosphere of Ar and $O_2$ having a total pressure of 2–3 mTorr as a sputter gas and in a range of 30–150 W as a sputter power, thus forming disks No. 1–20 that were single plates overcoated with ultraviolet curable resin. The disks were formed by changing their composition in order to examine the dependence on the composition of the recording thin film in a recording property. Table 1 shows the results of elementary analysis of the recording film in each disk by an Auger electron spectroscopy (hereafter referred to as AES). FIG. 1 shows the composition of each disk based on the results.

TABLE 1

| | AES | | | RATIO C/N[1] | | |
|---|---|---|---|---|---|---|
| | Composition (atom %) | | | After 34 | After a few | Power margin[2] | Integrated |
| Disk | Te | O | Pd | msec | minutes | of Jitter < 12.8% | Evaluation |
| 1 | 39 | 36 | 25 | Δ | Δ | X | X |
| 2 | 46 | 38 | 16 | Δ | Δ | X | X |
| 3 | 44 | 42 | 14 | ○ | ○ | ○ | ○ |
| 4 | 56 | 42 | 2 | ⊙ | ⊙ | ○ | ○ |
| 5 | 54 | 46 | 0 | X | ⊙ | ○ | X |
| 6 | 48 | 46 | 6 | ⊙ | ⊙ | ⊙ | ⊙ |
| 7 | 42 | 46 | 12 | ⊙ | ⊙ | ⊙ | ⊙ |
| 8 | 36 | 46 | 18 | ○ | ○ | ○ | ○ |
| 9 | 30 | 46 | 24 | Δ | Δ | Δ | Δ |
| 10 | 24 | 46 | 30 | X | X | X | X |
| 11 | 44 | 50 | 6 | ⊙ | ⊙ | ⊙ | ⊙ |
| 12 | 40 | 50 | 10 | ⊙ | ⊙ | ⊙ | ⊙ |
| 13 | 42 | 55 | 3 | ⊙ | ⊙ | ⊙ | ⊙ |
| 14 | 38 | 54 | 8 | ○ | ○ | ⊙ | ○-⊙ |
| 15 | 36 | 58 | 6 | ○ | ○ | ○ | ○ |
| 16 | 34 | 62 | 4 | X | X | X | X |
| 17 | 30 | 53 | 17 | ○ | ○ | ⊙ | ○-⊙ |
| 18 | 18 | 55 | 27 | X | X | X | X |
| 19 | 21 | 57 | 22 | Δ | Δ | ○ | Δ-○ |
| 20 | 15 | 65 | 20 | X | X | X | X |

[1]⊙: >52 dB, ○: 48–52 dB, Δ: 44–48 dB, X: <44 dB
[2]⊙: >30% pp, ○: 15–30% pp, Δ: 0–15% pp, X: non Single targets of TE and Pd were used as a raw material for forming a film by a sputter technique. However, the similar recording thin film can be obtained also using targets of a Te—Pd alloy, $TeO_2$ or the like.

The film thickness of about 40 nm was selected in order to increase the change in optical reflectance. As an example, FIG. 8 shows the dependence on the film thickness of the optical reflectance in a wavelength of 680 nm in a film having the same composition as the disk No. 7.

Figure 8:
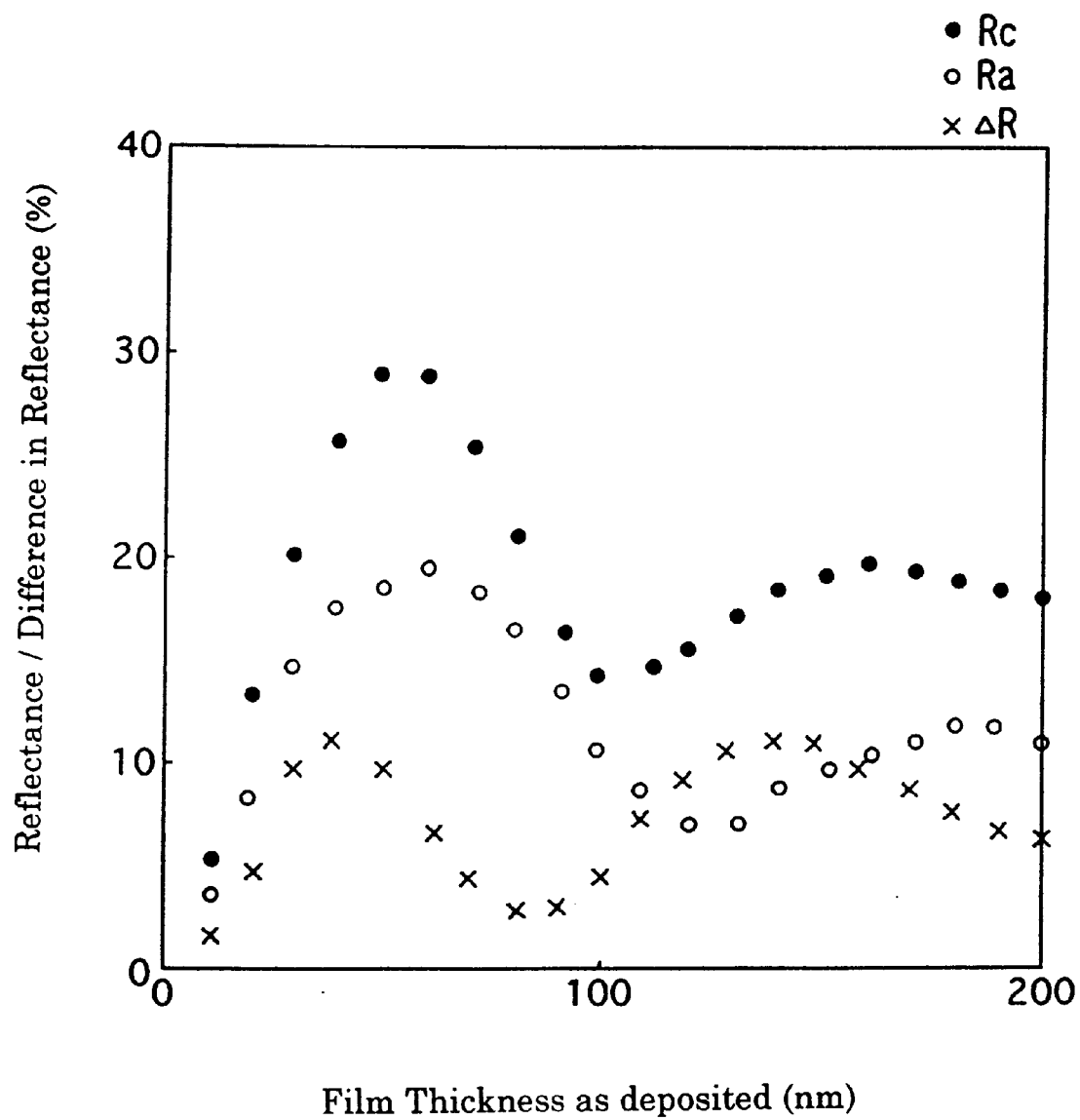
FIG. 8 shows the dependence of reflectance on the film thickness of a disk in an embodiment of the present invention.

In FIG. 8, Ra indicates the optical reflectance in a state as deposited, i.e. in an unrecorded state, Rc indicates the optical reflectance in a crystal state and ΔR is a difference in the optical reflectance, i.e. a value obtained by subtracting Ra from Rc. After laminating Te—O—Pd films having various film thicknesses on a polycarbonate substrate, these values were obtained by measuring the optical reflectance using a spectroscope. The sample in a crystal state was made through a crystallization treatment using a laser beam having predetermined power.

According to FIG. 8, ΔR is greatest with an approximate film thickness of 40 nm and 140 nm in the film having this composition. Especially, the vicinity of a film thickness of about 40 nm has the advantage in the stability of a servo such as focusing and/or tracking or the like, since the optical reflectance Ra in an unrecorded state is great for this thickness. In addition, there is also a merit that the cost can be reduced, since it is relatively thin.

However, this is the result only in a certain composition in a wavelength of 680 nm. The range of film thickness suitable for the use as an optical information recording medium is 10 nm–200 nm, more preferably 10 nm–70 nm, although it differs depending on, for example, a composition of Te/O/Pd, whether or not a dielectric protecting layer contacting with a recording thin film is present and/or a wavelength of a laser beam.

In the disk mentioned above, a mark edge recording of a bit length b of 0.41 μm at a linear velocity of 6.0 m/s was conducted using an optical system having a wavelength of 680 nm and NA of 0.6. Under this condition, when the beam intensity of a laser beam can be approximated by a Gaussian distribution and a diameter in which the beam intensity is 1/e of that in a spot center is defined as a spot diameter d, the spot diameter d is 0.69 μm and the ratio of the bit length b for the spot diameter d (b/d) is 0.6.

Under this condition, the laser power was modulated between P1–P3 (P1 is a recording power (peak power) in the range of 5.0–17.0 mW; P2 is a bias power of about 2.0–4.0 mW; and P3 is a bottom power of 1 mW) as shown in FIG. 7(a) and a single signal having a 3T cycle or a random signal modulated (8–16) was recorded once in an unrecorded track, thus evaluating the ratio C/N of the 3T signal and a jitter of the random signal.

The ratio C/N is measured generally in a few minutes after recording, but in some cases it takes some time before a signal is saturated after recording, i.e. untill a laser beam irradiated part in a recording thin film is crystallized sufficiently depending on the composition of a recording thin film. Therefore, it was checked whether or not the ratio C/N increased as the time passed by comparing the reproduced waveform in one revolution (after 34 msec) with that in a few minutes after recording data in a disk.

Table 1 shows the evaluation results for each disk No. 1–20. Table 1 also shows the ratio C/N in one revolution and in a few minutes after recording and the recording power margin in which the jitter is 12.8% or less. According to Table 1, in the area where the O atoms in the recording thin film are present at less than 40 atom %, thermal interference between recording marks becomes prominent, since the thermal conductivity of the recording thin film is too high. Consequently, the ratio C/N does not increase even if the peak power is increased, and the value of jitter is at least 12.8%.

On the other hand, in the area where the O atoms in the recording thin film are present in at least 40 atom %, sensitivity decreases a little since the thermal conductivity of the recording thin film decreases. However, the power margin in which the jitter is 12.8% or less increases. It can be said that this is more suitable as a practical recording medium for actual recording and reproducing, since it must correspond to power change to some degree.

In the area where the O atoms in the recording thin film are present in more than 60 atom %, recording marks cannot be written big enough, since the thermal conductivity of the recording thin film is too low. Consequently, it is not suitable for a practical use, since the ratio C/N is low and the sensitivity becomes insufficient.

These phenomena can be explained as follows. That is, in a Te—O—Pd recording thin film, it can be considered that Te and Pd atoms are distributed in a $TeO_2$ matrix. When this recording film is heated by irradiating a laser beam, the Te and Pd atoms that have been distributed begin to travel and crystallization proceeds through bonds, resulting in an increase of the optical reflectance.

In this case, the Te and Pd atoms can be bonded in a relatively short travel in the case where the ratio of the Te and Pd atoms for the $TeO_2$ matrix is relatively high. Therefore, a mark can be formed with relatively small recording power and in a relatively short time.

However, a surplus heat increases as the recording power increases. This heat is carried to the peripheral part of the mark and the crystallization area is broadened unnecessarily, resulting in blur of the edge of the mark and a great jitter.

On the contrary, a relatively long travel is required in order to bond the Te and Pd atoms in the case where the ratio of the Te and Pd atoms for the $TeO_2$ matrix is relatively low. Therefore, relatively high recording power and a relatively long time are required to form a mark. Consequently, the crystallization area is difficult to be broadened even if the recording power is increased, resulting in a small ratio of C/N and low sensitivity. Considering such a mechanism, a preferable recording property at high density can be obtained only if the ratio of the Te and Pd atoms for the $TeO_2$ matrix is neither too high nor too low, i.e. in an appropriate range.

Precisely, the appropriate range should be indicated by the range of the ratio of Te and Pd in a part being crystallized for $TeO_2$ in a matrix part, but almost the same range can be indicated by the range of the ratio of O atoms comprised in a recording film. The range of the ratio of O atoms is 40 atom %–60 atom %.

In a composition not comprising a Pd atom in a recording thin film, it takes time for a recording thin film to be crystallized, i.e. for recording signals to be saturated and the ratio of C/N right after recording is low, which is cancelled by adding Pd.

As mentioned above, it is conceived that the Pd has a function to promote a crystal growth of Te at the time of irradiating a laser beam in a $TeO_x$ thin film. This function enables a crystal grain of Te or Te—Pd alloy that has been further crystallized to be formed at high speed. The minimum amount of Pd for obtaining the effect was about 2 atom % for the entire recording thin film.

On the contrary, too large amount of Pd also is not preferable. The amount of Pd exceeding the amount required for a bond with Te does not contribute to phase change and decreases the change of optical reflectance accompanied by crystallization optically, resulting in a low ratio of C/N. The limit of Pd was about 25 atom % for the entire recording thin film.

Thus, taking all of the ratio of C/N (including the ratio right after recording), sensitivity, jitter and the like into consideration, it can be said that the composition suitable for this recording condition is in the range of 40 atom %–60 atom % of O atoms and 2 atom %–25 atom % of Pd atoms in a recording thin film. This range is shown in the area surrounded by A, B, C and D in FIG. 1. This composition range can be selected suitably according to a recording and reproducing condition such as, for example, linear velocity or the like.

Figure 9:
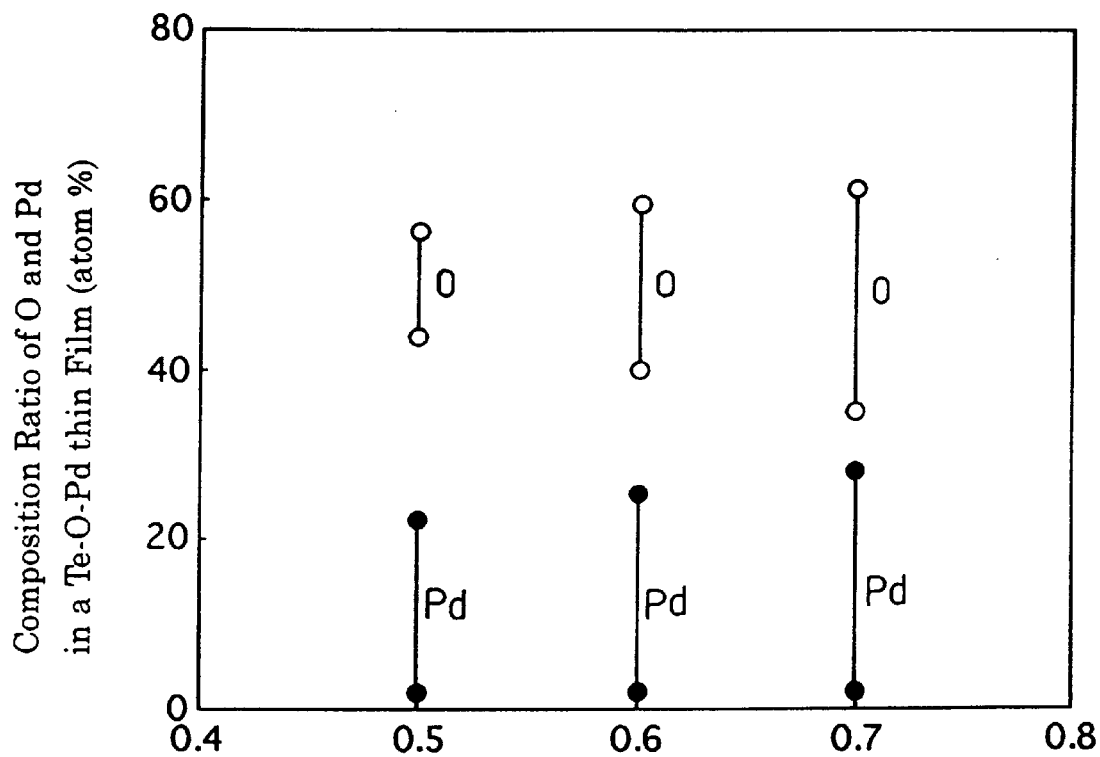
FIG. 9 shows the dependence of the recording condition in which sufficient recording property can be obtained on composition in an embodiment of the present invention.

Under completely the same conditions, except that recording density was changed into 0.48 μm and 0.35 μm in a bit length, i.e. under the condition that the ratio of a bit length b for a spot diameter d (b/d) is 0.7 and 0.5, recording and reproducing in the disk No. 1–20 mentioned above was conducted. From the results, a composition range in which a sufficient recording property under the condition was shown was determined, as in the case of b/d=0.6 mentioned above. The results are shown in FIG. 9 including also the case of b/d=0.6. According to FIG. 9, it can be seen that the composition range of both O and Pd indicating that a sufficient recording property becomes narrower as the ratio b/d decreases.

In the explanation above, a material composed only of 3 elements of Te, O and Pd was used as a recording thin film. However, for the purpose of fine adjustment of each property such as thermal conductivity, an optical constant or the like, improvement in heat resistance, environmental reliability or the like, at least one element selected from metal, metalloid, semiconductor and a nonmetallic element such as Au, Pt, Ag, Cu, Bi, Si, Se, S, N, F, C or the like may be added to a recording thin film suitably as a subsidiary ingredient as required. Generally, the subsidiary ingredient can be added in the range of a composition ratio within about 5 atom % of the entire recording thin film.

The optical information recording medium according to the present invention that has main components of Te, O and Pd, wherein a composition ratio of O atoms is 40 atom %–60 atom % and that of Pd atoms is 2 atom %–25 atom %, has a composition suitable for a method of recording and reproducing under the condition of, for example, b/d=0.7 or less as mentioned above. However, it can be also applied to a conventional method of recording and reproducing under the condition of the bid is more than 0.7.

(Embodiment 2)

On a first transparent substrate made of polycarbonate resin having a thickness of 0.6 mm provided with grooves having a groove pitch of 1.48 μm for guiding a laser, a recording thin film made of Te, O and Pd was laminated to a thickness of about 20 nm as a first information layer by a sputtering technique using single material targets (a diameter of 4 inches and a thickness of about 6 mm) of both Te and Pd in an atmosphere of Ar and $O_2$ having a total pressure of about 2–3 mTorr as a sputter gas and in a range of 30–150 W as a sputter power. Next, a recording thin film composed of Te, O and Pd was laminated to a thickness of about 60 nm as a second information layer on a second substrate similar to the first substrate by the same method. The composition of both information layers is Te:O:Pd=42:46:12 (a ratio in the number of atoms) according to an Auger electron spectroscopy (hereafter referred to as AES). Single targets of Te and Pd were used as a raw material for forming a film by a sputter technique. However, the similar recording thin film can be obtained also using a target of a Te—Pd alloy and $TeO_2$ or the like.

The second substrate obtained above was held horizontally with the thin film surface facing up, and an ultraviolet curable resin was applied to the thin film surface as a separating layer, on which the first substrate was pressed with the thin film surface facing down. Then, it was revolved for a certain time at constant speed so as to obtain a separating layer having a desired thickness, thus excess ultraviolet curable resin was eliminated. As a next step, the resin was hardened by irradiating an ultraviolet lamp beam from the side of the first substrate. As a result, the thickness of the separating layer measured was about 40 μm, which was thicker than the depth of focus mentioned above.

Figure 10:
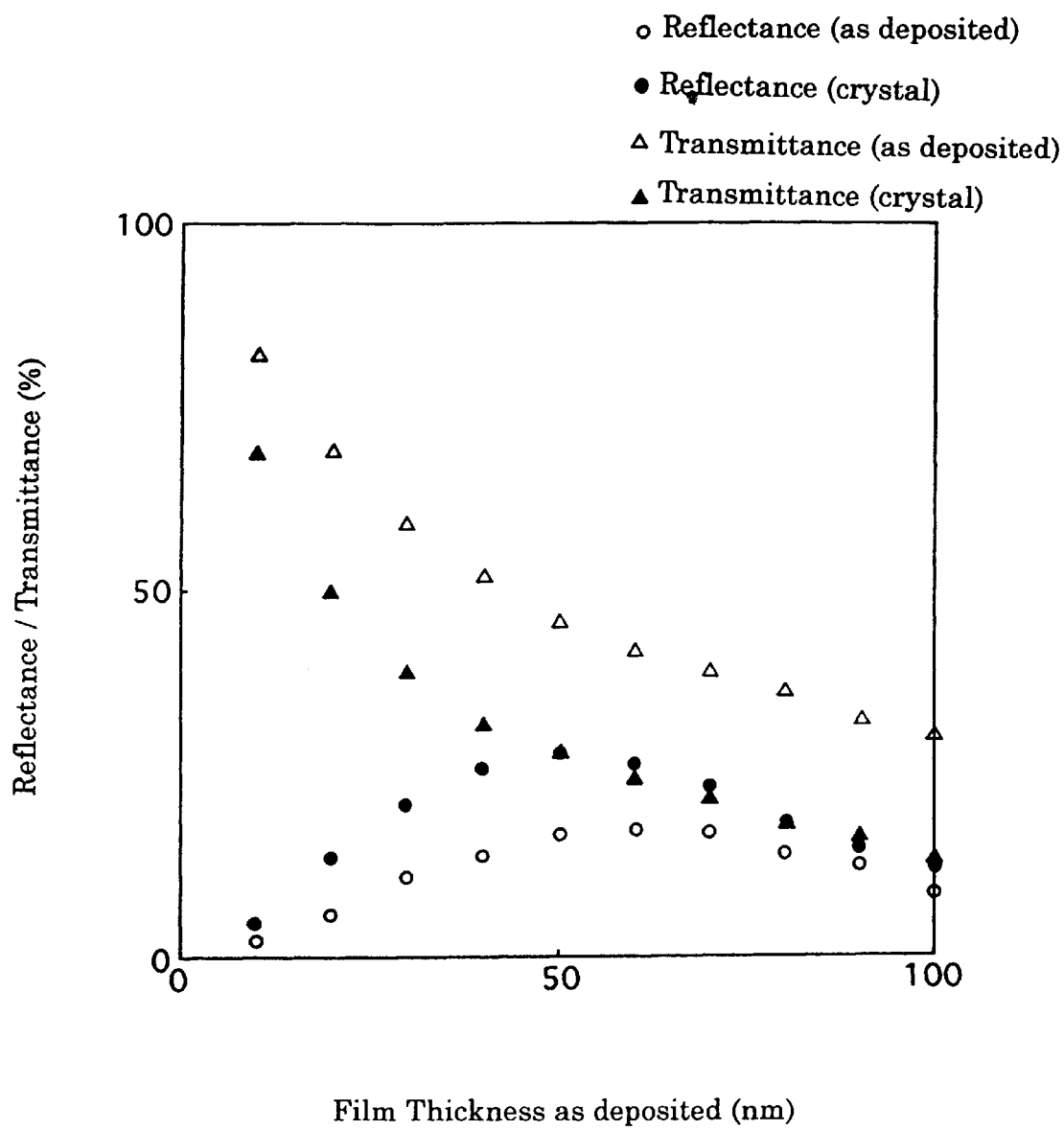
FIG. 10 shows the dependence of optical reflectance and light transmittance on the film thickness of a disk in an embodiment of the present invention.

The film thickness selected in this case is based on the following optical design. FIG. 10 shows the dependence on the film thickness of optical reflectance and light transmittance of a Te—O—Pd film at a wavelength of 680 nm. In FIG. 10, Ra and Ta indicate optical reflectance and light transmittance in a state as deposited, i.e. in an unrecorded state, Rc and Tc indicate optical reflectance and light transmittance in a crystal state respectively and ΔR is a difference in the optical reflectance, i.e. the value obtained by subtracting Ra from Rc. After laminating Te—O—Pd films having various film thicknesses on a polycarbonate substrate, these values were obtained by measuring the optical reflectance and the light transmittance using a spectroscope. The sample in a crystal state was made through a crystallization treatment using a laser beam having predetermined power.

In order to increase the strength of the recorded signals, ΔR should be increased. However, according to FIG. 6, ΔR is greatest for an approximate film thickness of 40 nm and 140 nm in the film having this composition. Almost no beam is transmitted with a film thickness of about 140 nm. On the contrary, a beam is transmitted to some extent with a film thickness of about 40 nm, which is suitable as a first information layer. The film thickness of about 40 nm has the advantage in reproducing signals and stability of a servo such as focusing, tracking or the like, since a sufficient quantity of reflected light can be obtained due to high optical reflectance. From the reasons mentioned above, the thickness of the first and the second information layer was selected to be about 40 nm. Attaching importance to light transmittance, a thickness of 20 nm that is thinner than 40 nm and has an optical reflectance to some extent was selected for the first information layer. Attaching importance to optical reflectance, a thickness of 55 nm in which the optical reflectance becomes the highest was selected for the second information layer.

Table 2 below shows an actual measurement value of R1, T1 and R2 mentioned above and calculated values (using Formula 2) of r1 and r2 in each case of the state as deposit and the crystal condition of each information layer for a beam with a wavelength of 680 nm in an optical information recording medium having the above-mentioned structure of film thickness.

TABLE 2

| | State of First Information Layer | | | |
|---|---|---|---|---|
| | as deposited | as deposited | crystal | crystal |
| | State of Second Information Layer | | | |
| | as deposited | crystal | as deposited | crystal |
| R1 | 6% | 6% | 14% | 14% |
| T1 | 69% | 69% | 50% | 50% |
| R2 | 12% | 27% | 12% | 27% |
| r1 | 6% | 6% | 14% | 14% |
| r2 | 6% | 13% | 3% | 7% |

(Remarks)
R1: Optical reflectance of the first information layer
T1: Light transmittance of the first information layer
R2: Optical reflectance of the second information layer
r1: Optical reflectance of a medium in reproducing information in the first information layer
r2: Optical reflectance of a medium in reproducing information in the second information layer According to Table 2, the ratio (K) of r1 for r2 (K=r1/r2) is 1.0 or 2.0, since r1 is 6% and r2 is 6% or 3% in the state as deposited in the first and the second information layers. In the first and second information layers, the value of K is 1.1 or 2.0, since r1 is 14% and r2 is 13% or 7% in a crystal condition. Consequently, the value of K falls in the range of 1.0–2.0 considering all of the cases.

It is necessary for the first information layer to have a high light transmittance and an appropriate optical reflectance in order to obtain the value of K within the tolerance. Particularly, in the case of using a general recording thin film requiring recording of at least 6 mW as the second information layer, the light transmittance is preferably at least 40%, since a semiconductor laser that can be mass-produced has an output of only about 15 mW. The range of the film thickness that meets the requirement is in the range of 10 nm–50 nm as seen from FIG. 10, although it differs depending on the composition, the wavelength of a laser beam or the like.

In the disk mentioned above, a mark edge recording of a bit length b of 0.41 μm at a linear velocity of 6.0 m/s was conducted using an optical system having a wavelength of 680 nm and NA of 0.6. Under this condition, when the beam intensity of a laser beam can be approximated by a Gaussian distribution and a diameter in which the beam intensity is 1/e of that in a spot center is defined as a spot diameter d, the spot diameter d is 0.69 μm and the ratio of the bit length b for the spot diameter d (b/d) is 0.6.

Under this condition, laser power was modulated between P1–P3 (P1 is the recording power (peak power) in the range of 5.0–15.0 mW; P2 is the bias power of about 2.0–3.0 mW; and P3 is the reproducing power of 1 mW) as shown in FIG. 7(a) and a single signal having a 3T cycle was recorded, thus measuring the ratio C/N. A random signal modulated (8–16) was recorded, thus measuring a jitter.

The ratio C/N is measured generally in a few minutes after recording, but in some cases it takes some time before a signal is saturated after recording, i.e. untill a laser beam irradiated part in a recording thin film is crystallized sufficiently depending on the composition of a recording thin film. Therefore, it was checked whether or not the ratio C/N increased as the time passed by comparing the reproduced waveform in one revolution (after 34 msec) with that in a few minutes after recording data in a disk.

As a result, in the case of recording a single signal having a 3T cycle, the following ratio of C/N was obtained: about 51 dB at a recording power of at least 9 mW in the first information layer; in the case where the first information layer has not been recorded, about 50 dB at a recording power of at least 11 mW in the second information layer; and in the case where the first information layer has been recorded, about 49 dB at a recording power of at least 12 mW in the second information layer. In the case of recording the random signals modulated (8–16), an eye pattern favorable in a reproduced signal was obtained in any information layer. The power margin obtaining a jitter of <12.8% was at least 30% pp.

As explained above, according to the present invention, an optical information recording medium in which a favorable recording property can be obtained in a wide power margin can be provided. The favorable recording property means that the ratio of C/N is high and a jitter is low, especially, in recording and reproducing of information having a low ratio (b/d) of a recording bit length b for a spot diameter d.

What is claimed is:

1. An optical information recording medium, comprising an information layer comprising at least Te, O and M atoms (wherein the M is at least one kind of atom selected from a metallic element, a metalloid element or a semiconductor element),
   wherein the information layer comprises the O atoms in 40 atom %–60 atom %, the M atoms in 2 atom %–25 atom % and the Te atoms in 15 atom %–58 atom %,
   wherein in the case where an optical beam for recording signals is irradiated to the optical information recording medium through an object lens, when beam intensity distribution can be approximated by a Gaussian distribution and a diameter in which the beam intensity is 1/e of that in a spot center is defined as a spot diameter (wherein the spot diameter is indicated by d and a length of the recording bit is indicated by b), the information signals are recorded and reproduced under the condition that the ratio of the bit length b for the spot diameter d (d) is 0.7 or less.

2. An optical information recording medium according to claim 1, wherein the film thickness of the information layer is between 10 nm–70 nm.

3. An optical information recording medium according to claim 1, wherein an overcoat layer is further provided on the information layer.

4. An optical information recording medium, wherein two information recording media each having an information layer on a transparent substrate are integrated through an adhesion layer, and at least one of the information layers is the information layer according to claim 1.

5. An optical information recording medium, wherein a plurality of information layers are further provided on an information layer through a separating layer and the information layer nearest to a substrate is the information layer according to claim 1.

6. An optical information recording medium according to claim 5, wherein the film thickness of the information layer nearest to the substrate is 10 nm–50 nm.

7. An optical information recording medium according to claim 5, wherein the light transmittance of the information layer nearest to the substrate is at least 40%.

8. An optical information recording medium according to claim 3, wherein the thickness of the overcoat layer is in the range of 2–100 $\mu$m.

9. An optical information recording medium according to claim 4, wherein the thickness of the adhesion layer is in the range of 2–100 $\mu$m.

10. An optical information recording medium according to claim 5, wherein the thickness of the separating layer is at least the depth of focus defined as $\Delta Z = \lambda/\{2(NA)^2\}$ in the adjacent information layers in the case where an optical beam having a wavelength of $\lambda$ is irradiated through an object lens having a numerical aperture of NA.

11. An optical information recording medium according to claim 5, wherein the thickness of the separating layer is in the range of 2–100 $\mu$m.

12. An optical information recording medium according to claim 1, wherein the M atom is at least one kind of atom selected from at least one metallic element selected from Al, Sc, Ti, V, Cr, Mn, Fe, Co, Ni, Cu, Zn, Ga, Y, Zr, Nb, Mo, Tc, Ru, Rh, Pd, Ag, Cd, In, La, Ce, Pr, Nd, Pm, Sm, Eu, Gd, Th, Dy, Ho, Er, Tm, Yb, Lu, Hf, Ta, W, Re, Os, Ir, Pt, Au, Hg, Tl and Pb, at least one metalloid element selected from B, C, As, Se, Sb and Bi and at least one semiconductor element selected from Si, Ge and Sn.

13. An optical information recording medium according to claim 1, wherein the M atom is Pd.

14. An optical information recording medium according to claim 1, wherein the O atom in the information layer is present at a ratio of more than 45 atom % but not more than 60 atom %.

15. A method of recording and reproducing information signals in an optical information recording medium, comprising an information layer made of a thin film material comprising at least Te, O and an element M (wherein M is at least one kind of element selected from a metallic element, a metalloid element or a semiconductor element), wherein the information layer comprises the O atoms in 40 atom %–60 atom %, the M atoms in 2 atom %–25 atom % and the Te atoms in 15 atom %–58 atom %, on a transparent substrate, wherein the information signals are recorded and reproduced by irradiating an optical beam from the side of the transparent substrate, and in the case where the optical beam is irradiated to the optical information recording medium through an object lens, when beam intensity distribution can be approximated by a Gaussian distribution and a diameter in which the beam intensity is 1/e of that in a spot center is defined as a spot diameter (the spot diameter is indicated by d and a length of the recording bit is indicated by b), the information signals are recorded and reproduced under the condition that the ratio of the bit length b to the spot diameter d (b/d) is 0.7 or less.

16. A method of recording and reproducing in an optical information recording medium according to claim 15,
wherein in the case of modulating intensity of an optical beam at least within the following power levels (P1>P2≧P3≧0): a power level P1 that is sufficient for crystallizing an irradiated part also in the case of irradiating while modulating the beam; and power levels P2 and P3 that do not crystallize an irradiated part also in the case of irradiating the beam without modulating, and forming at least a mark longer than the shortest in the marks having some different lengths to be recorded, a pulse shape for forming a mark is a recording pulse train made of a plurality of pulse trains that have been modulated between the power levels P1 and P3 and the part where no mark is formed is kept constant with the power level P2.

17. A method of recording and reproducing in an optical information recording medium according to claim 15,
wherein the power level 1 has a power enabling an irradiated part to be melted instantaneously also in the case of irradiating while modulating the beam.

18. A method of recording and reproducing in an optical information recording medium according to claim 15,
wherein at least each pulse except the first pulse and the last pulse has the same width and is a rectangular pulse, and each space between the rectangular pulses is also equivalent.

19. A method of recording and reproducing in an optical information recording medium according to claim 15,
wherein a cooling section for the power level P3 is provided right after the last pulse in the recording pulse train.

20. An apparatus for recording and reproducing in an optical information recording medium, comprising an information layer comprising at least Te, O and M atoms (wherein the M is at least one kind of element selected from a metallic element, a metalloid element or a semiconductor element), wherein the information layer comprises the O atoms in 40 atom %–60 atom %, the M atoms in 2 atom %–25 atom % and the Te atoms in 15 atom %–58 atom %, on a transparent substrate, wherein the apparatus for recording and reproducing can at least record information signals by irradiating an optical beam from the side of the transparent substrate, and a modulation means that modulates the intensity of the optical beam so that the ratio (b/d) of the bit length b to the spot diameter d is 0.7 or less is provided in the case of at least recording a bit string of the information signals by irradiating the optical beam to the optical information recording medium through an object lens, when beam intensity distribution can be approximated by a Gaussian distribution and a diameter in which the beam intensity is 1/e of that in a spot center is defined as a spot diameter.

21. An apparatus for recording and reproducing in an optical information recording medium according to claim 20, wherein in the case of modulating the intensity of an optical beam at least within the following power levels (P1>P2≧P3≧0): a power level P1 that is sufficient for crystallizing an irradiated part also in the case of irradiating while modulating the beam; and power levels P2 and P3 that do not crystallize an irradiated part also in the case of irradiating the beam without modulating, and forming at least a mark longer than the shortest in the marks having some different lengths to be recorded, a modulation means is provided for modulating the intensity of the optical beam so that a pulse shape for forming a mark is a recording pulse train made of a plurality of pulse trains that have been modulated between the power levels P1 and P3 and the part where no mark is formed is kept constant with the power level P2.

22. An apparatus for recording and reproducing in an optical information recording medium according to claim 21, wherein the power level 1 has a power enabling an irradiated part to be melted instantaneously also in the case of irradiating while modulating the beam.

23. An apparatus for recording and reproducing in an optical information recording medium according to claim 21, wherein each pulse except at least the first pulse and the last pulse has the same width and is a rectangular pulse, and each space between the rectangular pulses is also equivalent.

24. An apparatus for recording and reproducing in an optical information recording medium according to claim 21, wherein a cooling section for the power level P3 is provided right after the last pulse in the recording pulse train.

25. A method for manufacturing an optical information recording medium, wherein using a thin film material comprising Te, O and an element M (wherein the M is at least one kind of atom selected from a metallic element, a metalloid element or a semiconductor element), an information layer comprising O atoms in 40 atom %–60 atom %, M atoms in 2 atom %–25 atom % and Te atoms in 15 atom %–58 atom % is formed on a transparent substrate by a vapor phase thin film deposition, wherein in the case where an optical beam for recording signals is irradiated to the optical information recording medium through an object lens, when beam intensity distribution can be approximated by a Gaussian distribution and a diameter in which the beam intensity is 1/e of that in a spot center is defined as a spot diameter (wherein the spot diameter is indicated by d and a length of the recording bit is indicated by b), the information signals are recorded and reproduced under the condition that the ratio of the bit length b for the spot diameter d (b/d) is 0.7 or less.

26. A method for manufacturing an optical information recording medium according to claim 25, wherein after coating with an energy beam hardened resin on an information layer an overcoat layer is further formed by hardening through irradiation of an energy beam.

27. A method for manufacturing an optical information recording medium according to claim 25, wherein two information recording media each having an information layer on a transparent substrate are prepared and integrated by applying an energy beam hardened resin or a hot-melt adhesion layer between the two media.

28. A method for manufacturing an optical information recording medium according to claim 25, wherein after coating with an energy beam hardened resin on an information layer an separating layer is further formed by hardening through irradiation of an energy beam and the second information layer is further formed thereon.

29. A method for manufacturing an optical information recording medium according to claim 25, wherein the information layer comprises the O atoms by 40 atom %–60 atom % and the M atoms by 2 atom %–25 atom %.

30. A method for manufacturing an optical information recording medium according to claim 25, wherein the film thickness of the information layer is 10 nm–70 nm.

* * * * *